Nov. 5, 1940. S. R. BERGMAN 2,220,751
TORSIONAL VIBRATION DAMPENER
Filed Dec. 8, 1938
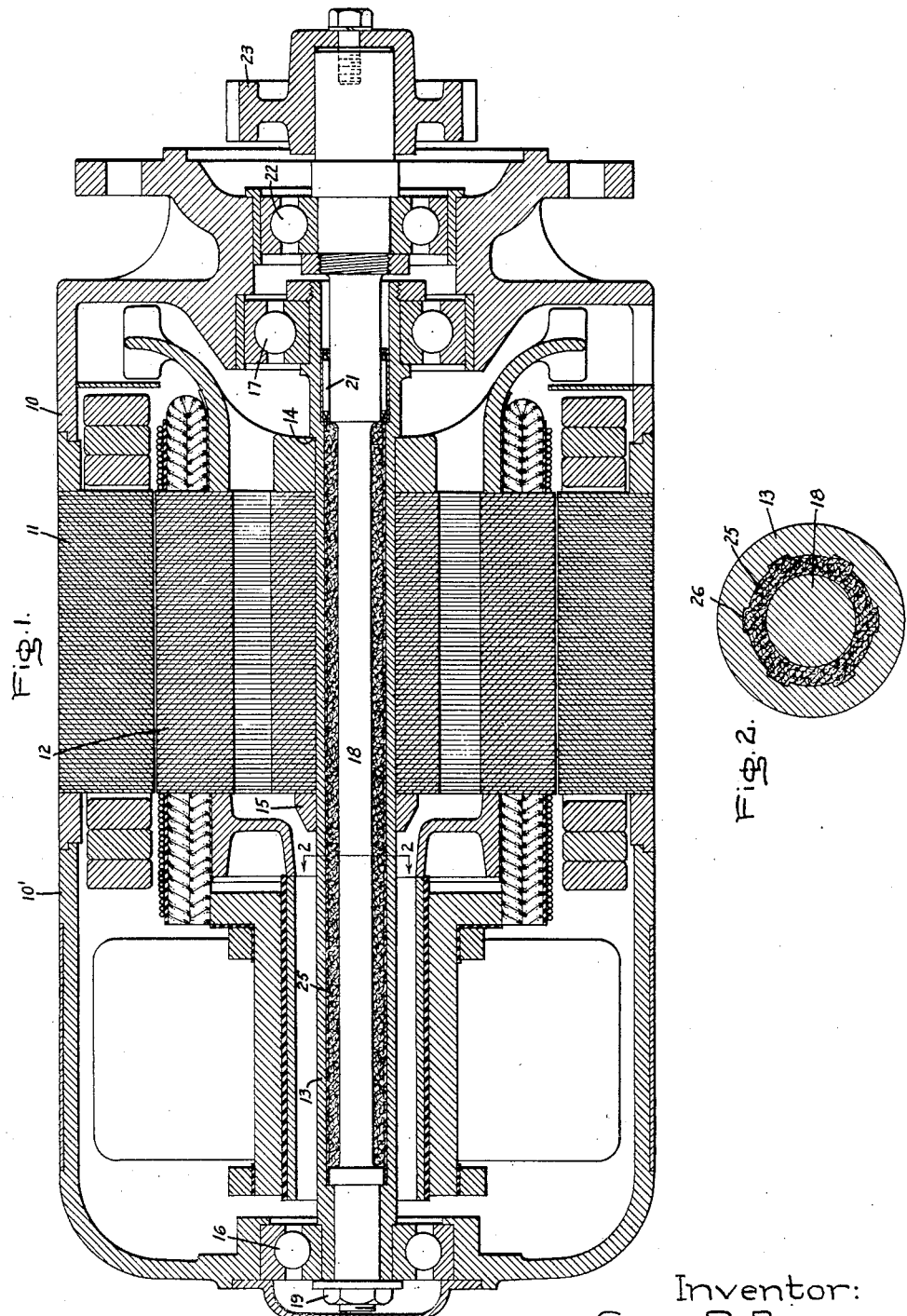
Inventor:
Sven R. Bergman,
by Harry E. Dunham
His Attorney.

Patented Nov. 5, 1940

2,220,751

UNITED STATES PATENT OFFICE 2,220,751

TORSIONAL VIBRATION DAMPENER

Sven R. Bergman, Nahant, Mass., assignor to General Electric Company, a corporation of New York Application December 8, 1938, Serial No. 244,633

6 Claims. (Cl. 64—1)

This invention relates to power transmission mechanisms and more specifically to means for dampening shaft vibrations in a driving connection.

In certain driving connections, as between an internal combustion engine and a generator, shaft failures occur as the result of torsional vibrations due to the pulsating characteristics of the power source. Various means, including resilient connections, have been used between the main engine shaft and the driven device for insulating or minimizing the transmission of torsional shocks. Such devices, however, have been incapable of withstanding the torsional stresses resulting upon the occurrence of resonance between the frequency of the engine vibrations, due to the succession of explosions, and the natural frequency of the driven shaft.

It is an object of this invention to provide a new and improved driving connection for absorbing torsional vibrations between a driving shaft and a driven shaft.

It is a further object of this invention to provide a new and improved arrangement for dampening torsional vibrations of a relatively flexible driven shaft which arrangement is low in cost, light in weight and efficient in operation.

In the illustrated embodiment of my invention, a relatively flexible and a relatively rigid shaft member are concentrically arranged and connected together at one end. The two shaft members are spaced apart throughout a considerable portion of their lengths, the space between the two shaft members being packed with a relatively resilient material or member which resists or dampens relative rotational movement of the flexible member with respect to the rigid member.

For a consideration of what I believe to be novel and my invention, attention is directed to the following description and the claims appended thereto taken in connection with the accompanying drawing.

Referring to the drawing, Fig. 1 is a longitudinal section through an electric generator illustrating one embodiment of my invention, while Fig. 2 is a cross-sectional view of a detail taken along the line 2—2.

The invention is here shown as embodied in an electric generator which is adapted to be driven by an internal combustion engine. The generator comprises end sections 10 and 10' having a field structure 11 mounted therebetween and an armature 12. The armature is mounted upon the outer shaft member 13 in any suitable manner, such as between the shoulder 14 provided on one end of the shaft member and the nut 15, the outer shaft member being rotatably supported in the generator end sections by means of the ball bearings 16 and 17. A second shaft member 18 is concentrically arranged within the hollow outer shaft member 13 and secured thereto at one end by means of the nut 19. The opposite end of the inner shaft member 18 which projects beyond the end of the outer shaft member is maintained in central alignment therewith by means of the needle bearing 21 suitably arranged therebetween. The shaft member 18 is mounted, by means of the ball bearing 22, in the end section 10, the outer end thereof being provided with a pinion 23 which is adapted to be engaged by a driving gear connected to the main engine shaft. The greater portion of the inner shaft member or that part between the needle bearing 21 and the opposite end is of a reduced cross-section which is relatively resilient and twists along its axis in accordance with the torsional vibrations transmitted through the pinion 23. It is understood that the outer shaft member 13 is relatively rigid so that during operation, due to the inertia of the armature 12, the two shaft members move about the axis relative to each other through limited arcs at the unconnected ends.

In accordance with my invention, I provide means between the concentrically arranged shaft members for dampening the torsional vibrations. It will be noted that an annular space is provided about the reduced section of the inner shaft between it and the surrounding shaft member. This space is packed tightly with a resilient member 25 which may consist of cotton, asbestos, spun glass fiber, or any other suitable material. If fibrous material is used, it may be spun or wound onto the shaft member 13 to a diameter slightly larger than the inner diameter of the outer shaft. The inner shaft may then be forced into the outer shaft so that the material is more or less solidly compressed in the space therebetween. In the preferred embodiment, it is desired to preclude relative sliding between the shaft members and the resilient material. Although this may be accomplished in various ways, I first coat the surface of the shaft 18 with a suitable cement before applying the resilient material thereon. The inner surface of the outer shaft member may be provided with a plurality of longitudinal grooves 26, as shown in Fig. 2, having relatively sharp edges which bite into the packing when the shaft parts are assembled, thus effectively securing the packing with respect to the inner surface of the outer shaft.

By the arrangement disclosed, as the inner flexible shaft 18 is twisted by the uneven impulses of power transmitted to it from the driving engine, the relative movement between the inner and outer shaft members is resisted by the internal friction or plastic hysteresis of the fibers of the member 25. Since no frictional movements take place between the metal surfaces and the resilient member or packing, no wearing at these points takes place, and the arrangement possesses a substantially unlimited life.

While in the illustrated embodiment it is more convenient that the inner shaft member be made flexible and the outer shaft member relatively stiff or rigid, it is obvious that in other modifications the inner shaft may be a rigid member and the outer shaft a relatively thin flexible sleeve. The packing member or material arranged between the two concentric driving and driven shafts would be equally effective in such modification to dampen the relative torsional vibratory movements therebetween.

Having described the principle of operation of my invention together with the apparatus which I now consider to represent the best embodiment thereof, I desire to have it understood that the apparatus shown is only illustrative and that the invention may be carried out by other means.

What I claim as new and desire to secure by Letters Patent of the United States, is—

1. The combination, a pair of relatively flexible concentrically arranged shaft members, said shaft members being secured together at one end and being spaced apart throughout the remainder of their lengths, relatively resilient fibrous means wound around and secured upon the surface of the inner shaft member, and means for securing the outer surface of said resilient means to the inner surface of said outer shaft member.

2. The combination, a torsionally resilient driving shaft, a relatively rigid driven shaft surrounding said driving shaft and connected at one end to said driving shaft, said shafts being spaced apart for a considerable portion of their lengths, and resilient means substantially filling said space between shafts and engaging the adjacent surfaces of each.

3. The combination, a torsionally resilient shaft member, a relatively rigid shaft member, said shaft members being concentrically arranged and secured together adjacent one end thereof, said shaft members being spaced apart over a substantial portion of the length of said shaft members, and resilient means arranged in said space throughout said substantial portion and secured to the surface of said shaft members.

4. The combination, a torsionally resilient shaft member, a relatively rigid shaft member, said shaft members being concentrically arranged and connected together at one end, said shaft members being spaced apart over a considerable portion of their lengths, resilient means secured to the surface of the inner shaft member substantially throughout the length thereof, and means provided on the inner surface of said outer shaft member for positively engaging said resilient means.

5. The combination, a resilient shaft member, a relatively rigid shaft member, said shaft members being concentrically arranged in spaced apart relationship and secured together at one end thereof, a flexible material wound around and cemented to the surface of said inner shaft member, corrugations in the inner surface of said outer shaft member for frictionally engaging with said material so as to preclude relative movement between the outer surface of said material and the inner surface of said outer shaft member.

6. The combination, a torsionally resilient shaft member, a relatively rigid shaft member, said shaft members being concentrically arranged and having parts rigidly secured together, said shaft members being spaced apart over a substantial portion of the length of said shaft members, and resilient means arranged in said space throughout said substantial portion and secured to the adjacent surfaces of said shaft members.

SVEN R. BERGMAN.